July 6, 1965  J. CADIOU  3,193,751
DEVICE FOR CONTROLLING THE MOTOR OF A HYDROELECTRIC SET
Filed July 12, 1961  4 Sheets-Sheet 1
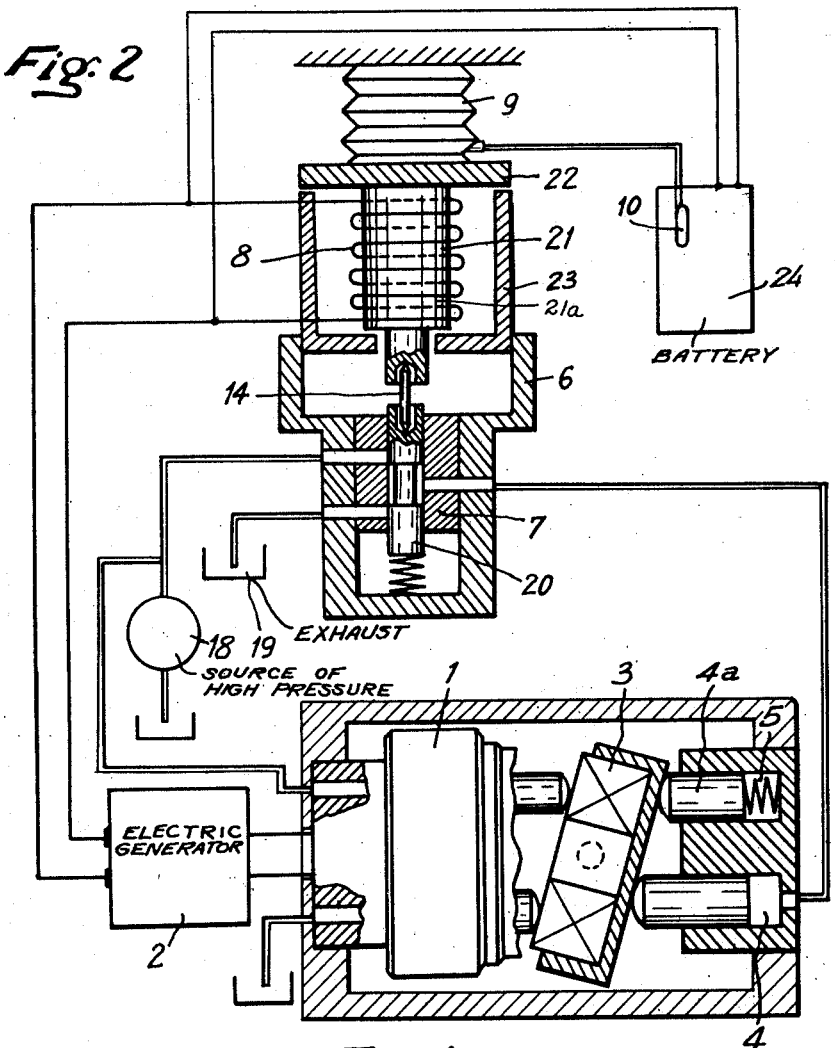
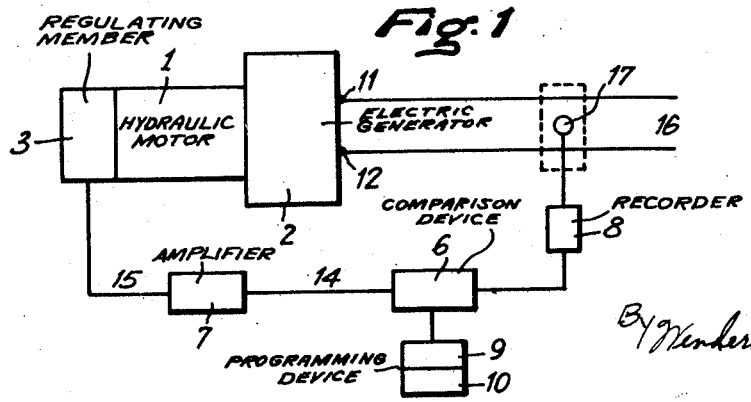
INVENTOR
JEAN CADIOU
ATTORNEYS

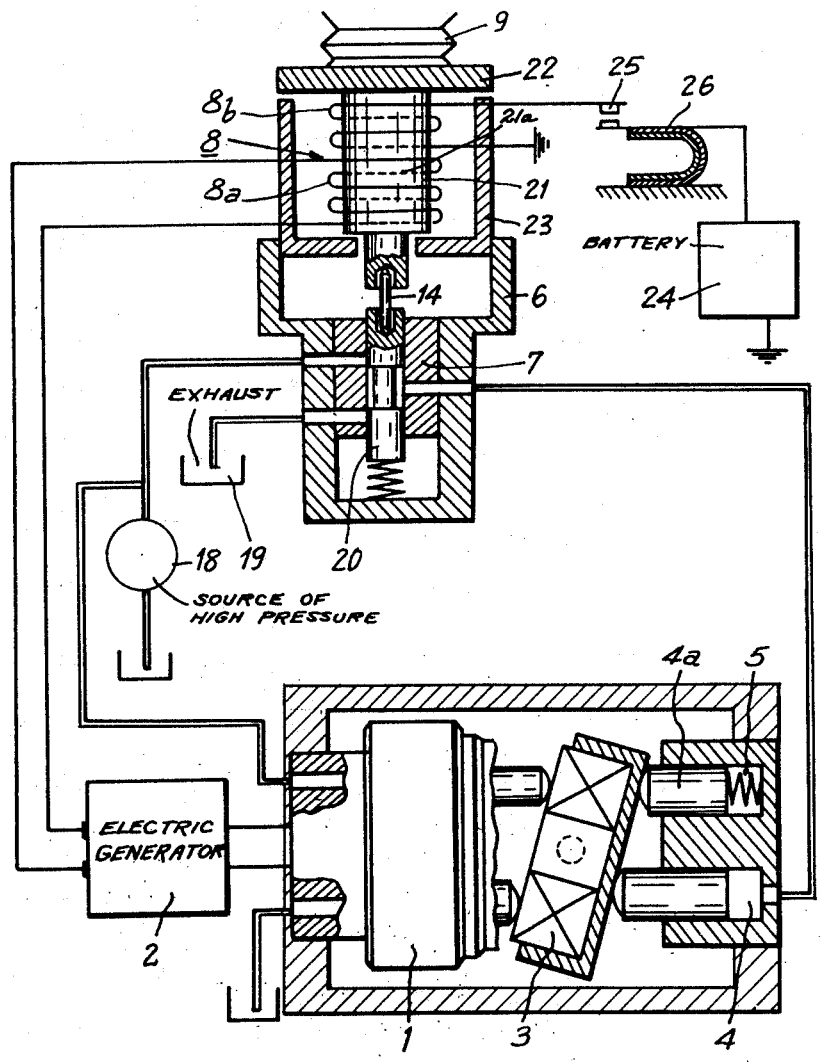

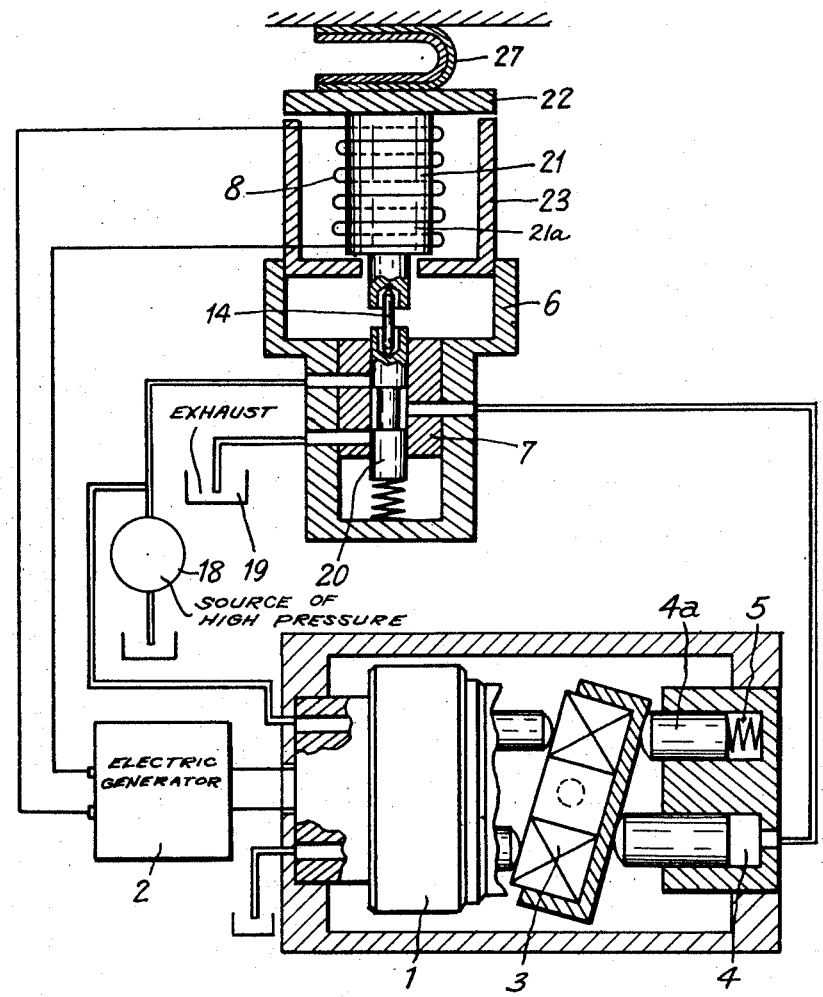

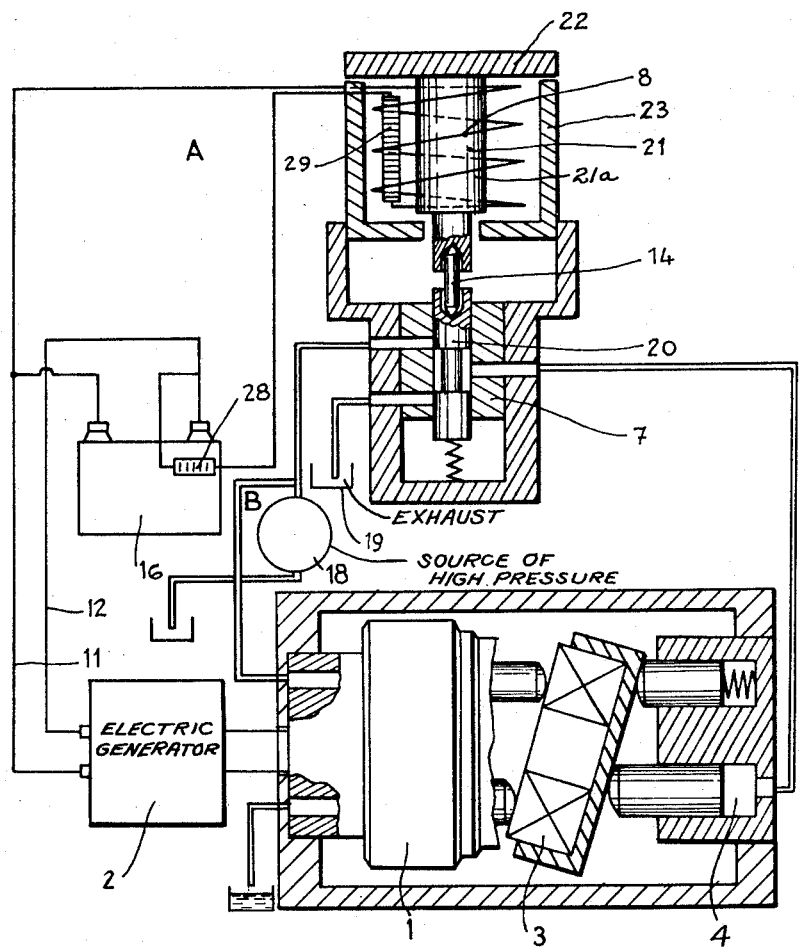

United States Patent Office 3,193,751
Patented July 6, 1965

3,193,751
DEVICE FOR CONTROLLING THE MOTOR OF A HYDROELECTRIC SET
Jean Cadiou, Paris, France, assignor to Societe Anonyme Andre Citroen, Paris, France, a corporation of France
Filed July 12, 1961, Ser. No. 123,452
Claims priority, application France, July 19, 1960, 833,391, Patent 1,270,612; Jan. 19, 1961, 850,195, Patent 79,050
8 Claims. (Cl. 320—35)

The engine units of machines or devices such as vehicles of any kind frequently have an electrical equipment supplied by an auxiliary generator. This generator is driven by the engine itself, but it may also be driven by an independent motor. In particular, in installations which comprise a source of liquid under pressure, devices have been produced in which the electric generator is driven by a special hydraulic motor.

The operation of a hydroelectric set of this kind is characterized by a speed or in general terms by standards of regulation, which are not related to the speed of the engine of the installation. Nor is its operation conditioned by a purely electrical regulation such as is the current practice in installations on vehicles.

The invention has for its object a device for controlling the motor of a hydroelectric set in dependence on one or more quantities which are characteristic of the operation of the generator, the device being characterized in that the said motor is of the type comprising a driving plate, the inclination of which controls the power, and a hydraulic cylinder for regulating the said inclination, means being provided for putting the said cylinder into communication with the high pressure side of the hydraulic circuit which drives the motor, or with the exhaust side, depending on the value assumed by the said quantity.

The quantities which are characteristic of the operation may be the output, the voltage, the current, the speed or even the temperature, or any other quantity liable to have an effect on the operation.

In accordance with a further feature of the invention, this input quantity may be maintained at a determined value, but it may be required to follow a previously arranged programme.

The invention will be more clearly understood by means of the description which follows below with reference to the accompanying drawings, in which the same reference numbers have been given to similar parts.

In these drawings:

FIG. 1 is a diagram of an installation in accordance with the invention.

FIG. 2 represents a first form of construction of a hydroelectric set provided with a device according to the invention.

FIGS. 3 and 4 relate to alternative forms of the invention.

FIG. 5 is a diagram of a further alternative form of the invention.

The hydraulic motor is of the barrel type, that is, of that type, in which a plurality of hollow cylinders in a block or barrel receive at one side pistons which bear against an impulse plate, inclined with relation to the axis of the barrel and oscillating upon a transverse axis. The opposite side of the cylindrical barrel bears against a distributor having two channels of which one communicates with the inlet of fluid at high pressure and the other the return to the tank. The pressure of the fluid forces the pistons to recoil, then to slide against the impulse plate while bringing about a rotation of the barrel. This type of motor and its operation are very well known. The invention is directed to the control thereof.

Referring to the diagram of FIG. 1, the hydraulic motor 1, the operation of which is regulated by the regulating member 3, drives the electric generator 2, this generator delivering its output over the circuits 11 and 12 to a utilization system 16.

The input quantity is measured by the detector 17 which is responsive to the current, voltage, temperature, etc., and is applied to a recorder 8.

The recorded value is transmitted by the electrical, hydraulic or other circuit to a comparison device 6 which simultaneously receives the reference value delivered by a programing device 9.

The resulting signal is directed over 14 to an appropriate amplifier 7, and after amplification is led by the conductor 15 to the regulating device 3 of the hydraulic motor 1.

These various elements will be selected from known means for arranging the regulation device, complying with the particular operating conditions required and regulating in an independent manner the operation of the hydroelectric set employed.

The following FIGS. 2 to 4 illustrate preferred forms of embodiment. In FIG. 2, the device is intended to control the output of a hydraulic motor 1 in dependence on two quantities associated with the operation of an electric generator 2 driven by the said motor, the device comprising essentially a hydraulic distributor 7 which controls the connection of the cylinder 4 which regulates the inclination of the driving plate 3 of the motor, either to the source of high pressure 18 or to the exhaust 19.

The displacement of the slide-valve 20 of the distributor 7 is effected by a connecting-rod 14, which is in turn driven by the core 21, the displacements of which are proportional to the said quantities.

One of these quantities is for example the electrical output voltage of the generator 2 which, as soon as it reaches a sufficient value, has the effect of establishing, through the coil 8, the circuit between the armature 22 and the magnetic circuit 23.

The result of this is that the cylinder 4 is connected to the exhaust, so that the driving plate 3 has a tendency to return to its neutral position under the action of a restoring spring 5, acting on a piston 4a, which causes a reduction in the output of the motor and in consequence the re-establishment of the generator voltage to the desired value.

In the case where the generator 2 is used to charge a battery 24, a further input quantity of the servo-mechanism will advantageously be the temperature of this battery.

In the form of embodiment of FIG. 2, the temperature of the battery 24 is measured by the variations of volume of the fluid of a probe 10, which variations are transmitted to a bellows member 9 which assists in effecting the displacement of the armature 22.

In the alternative form shown in FIG. 3, the core 21 is excited by two coils 8a and 8b. The coil 8a is connected to the output side of the generator 2, while the coil 8b is connected to the terminals of the battery 24 through the intermediary of contacts 25 which can be closed or separated by a bi-metallic strip 26 thermally coupled to the battery.

In the alternative form shown in FIG. 4, the bi-metallic strip 27 is again thermally coupled to the battery (not shown), but applies its action mechanically to the core 21.

The installation shown in FIG. 5 comprises, as in the previous cases, a motor 1, the operation of which is regulated by the plate 3 and which drives the electric generator 2, having its output connected to the battery 16 over the conductors 11 and 12. A hydraulic distributor 7 effects the connection of a cylinder 4 regulating the position of the driving plate 3, either to the high pressure source 18 or to the exhaust 19.

The displacement of the slide-valve 20 of the distributor 7 is effected by the intermediary of a connecting-rod 14 from an electro-magnet 21 having a plunger core 21a, with a magnetic circuit 22, 23, the winding 8 of which is supplied in parallel with the battery 16 to be charged.

Following the present alternative form, there is interposed in the circuit of the coil 8 of the electromagnet, a thermistance 28 in close contact with the battery and which is preferably immersed in the electrolyte of the battery.

This thermistance, the resistance of which decreases with temperature increase, acts on the current of the electro-magnet in such manner as to increase this current when the temperature of the battery increases, so that the slide-valve is pushed back towards the bottom of the drawing, which puts the cylinder 4 in connection with the exhaust 19. The output of the motor diminishes, and in consequence the voltage of the generator 2 falls. The action is reversed when the temperature of the battery falls.

It can thus be seen that it is possible in this manner to regulate the voltage of the generator so that this voltage varies in the same manner as the voltage of the battery as a function of the temperature.

The electro-magnet may of course also be provided with a thermistance 29 in known manner.

It is of course possible by a suitable construction of the device to control the action of two or more input quantities following various laws adapted to the requirements of each particular case.

Those skilled in the art will be able to develop many alternative forms of construction without departing from the scope of the present invention.

I claim:

1. A control device for a hydraulic motor of the barrel type, actuated through a source of liquid under pressure, of a hydroelectric group comprising an electrical dynamo which furnishes a voltage usable for different apparatuses, particularly a battery, said motor comprising an inclined impulse plate, a hydraulic cylinder forming an abutment for said plate, a first means for placing said cylinder in communication with a source of liquid under pressure and exhaust, a second and a third means acting upon said first means, said second means being subject to the voltage generated by said generator and said third means being deformable means sensible to the temperature of the battery charge.

2. A control device in accordance with claim 1, wherein said first means comprises a slide-valve distributor, the displacement of said slide-valve being effected by said second and third means.

3. A control device in accordance with claim 2 wherein the electrical output voltage of the generator is applied to excite a coil, the core of which actuates said slide valve.

4. A control device in accordance with claim 1 wherein said deformable means comprise a bellows member in communication with a reservoir of liquid thermally coupled to said battery.

5. A control device in accordance with claim 1 wherein said deformable means comprise a bimetallic element thermally coupled to said battery.

6. A control device in accordance with claim 5, wherein said bi-metallic element opens and closes the circuit of an auxiliary excitation coil of the electro-magnet core.

7. A control device in accordance with claim 5 wherein said bi-metallic element applies a direct mechanical action on the core of said electro-magnet.

8. A control device in accordance with claim 1 wherein a thermistor is connected in series with the circuit of the winding of the electro-magnet acting on the distributor of the motor, said thermistor being in close contact with the battery and being preferably immersed, at least in part, in the electrolyte of said battery.

References Cited by the Examiner

UNITED STATES PATENTS

| | | | |
|---|---|---|---|
| 519,597 | 5/94 | Wetmore | 290—40.2 |
| 2,366,992 | 1/45 | Willing et al. | 320—35 X |
| 2,427,729 | 9/47 | Jenkins | 320—35 X |
| 2,699,123 | 1/55 | Bonnette et al. | 103—202 |
| 2,926,681 | 3/60 | Chilman | 290—40 X |

LLOYD McCOLLUM, *Primary Examiner.*

RALPH D. BLAKESLEE, *Examiner.*